(12) United States Patent
Gramse et al.

(10) Patent No.: US 12,553,951 B2
(45) Date of Patent: Feb. 17, 2026

(54) PARTIAL DISCHARGE FAULT DETECTOR FOR BATTERY TESTING

(71) Applicant: Keysight Technologies, Inc., Santa Rosa, CA (US)

(72) Inventors: Georg Gramse, Linz (AT); Manuel Kasper, Traun (AT)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 204 days.

(21) Appl. No.: 18/081,415

(22) Filed: Dec. 14, 2022

(65) Prior Publication Data

US 2024/0201267 A1     Jun. 20, 2024

(51) Int. Cl.
*G01R 31/382*     (2019.01)
*H01M 10/42*     (2006.01)

(52) U.S. Cl.
CPC ...... *G01R 31/382* (2019.01); *H01M 10/4285* (2013.01)

(58) Field of Classification Search
CPC .......................... G01R 31/382; H04M 10/4285
See application file for complete search history.

(56) References Cited

U.S. PATENT DOCUMENTS 7,239,147 B2    7/2007    Kume et al.

FOREIGN PATENT DOCUMENTS

| EP | 3964846 A1 | 9/2022 | |
| JP | 2000-195565 A | 7/2000 | |
| JP | 2016143580 A | * 8/2016 | ........... G01R 31/389 |

OTHER PUBLICATIONS

Louisa Hoffman et al. "High-Potential Test for Quality Control of Separator Defects in Battery Cell Production", Batteries 7.4 (2021) 64; pp. 1-5.
English Translation of EP3964846A1, 10 pgs.
English Translation of JP2000195565A, 7 pgs.

* cited by examiner

*Primary Examiner* — Minh Q Phan

(57) ABSTRACT

An apparatus, a method and a system for testing a battery are disclosed. A voltage source adapted to apply a voltage to an assembly having a first battery electrode, a second battery electrode and a separator layer disposed between the first and second battery electrodes. A current logger is adapted to measure a current caused by partial discharges in the separator layer caused by the contaminants or voids in the separator layer, or at an interface between the first battery electrode and the separator layer, or at an interface between the second battery electrode and the separator layer, or in the separator layer. The voltage is less than a threshold value of a characteristic breakdown voltage of the separator layer.

20 Claims, 7 Drawing Sheets

PARTIAL DISCHARGE FAULT DETECTOR FOR BATTERY TESTING

BACKGROUND

Batteries are ubiquitous in many technologies and are sought for new applications regularly. One type of battery is the Lithium-ion batteries (LIB). LIBs are used in a variety of applications, including mobile electronic devices (e.g., smartphones, tablets, and laptops) as well in providing electrical power for vehicles such as passenger cars and commercial vehicles. Compared to other battery technologies, LIBs beneficially provide favorable properties such as the high specific energy density as well as the good long-term stability. Accordingly, in order to ensure the quality of a battery, testing during production is required. In battery production fast and noninvasive quality measures are important to help ensure that faulty batteries are removed as early as possible in the production chain.

Batteries include a separator, which is a comparatively thin layer of dielectric or electrically insulating material disposed between the positive and negative battery electrodes. The separator prevents the contacting of the positive and negative electrodes, which would short the battery, likely cause its destruction, and possibly injuries to people near the battery when this happens.

Contaminants and voids between the positive and negative electrodes can result in undesired discharges across the separator layer. If too prevalent, these undesired discharges can deleteriously impact battery safety, performance and life. As such, during manufacture it is useful to test the separator layer to ensure contaminants are not present to an unacceptable level.

Contaminants and voids in the separator layer can range in size from a few microns to microns. Known testing of separator layers for contaminants and voids include microscopy techniques, which can be costly and add to the time required to manufacture a battery.

Another known method for testing separator layers for contaminants includes applying high voltages between the electrodes, with the separator in place. The voltage is chosen to be only slightly below the electrical breakdown voltage of the separator (typically 450-500V depending on the specific separator material and its thickness). If the separator withstands the voltage and no full discharge appears it is considered to be free of contaminants and passes the quality gate. Among other shortcomings of this known high voltage testing method, is the undesired electrical breakdown of the separator, even in separators that are not substantially contaminated. This not only results in a false positive failure detection, but also the destruction of the assembly caused by penetration of the electrical discharge of the separator layer. Moreover, high-voltage breakdown testing methods may not identify many sources of contamination.

What are needed, therefore, are an apparatus, method and system for non-invasive testing of batteries that overcome at least the drawbacks of known methods and systems described above.

SUMMARY

According to an aspect of the present disclosure, an apparatus for testing a battery is disclosed. The apparatus comprises: a voltage source adapted to apply a voltage to an assembly comprising a first battery electrode, a second battery electrode and a separator layer disposed between the first and second battery electrodes; and a current logger connected to the second battery electrode, and adapted to measure a current caused by partial discharges in the separator layer caused by the contaminants or voids in the separator layer, or at an interface between the first battery electrode and the separator layer, or at an interface between the second battery electrode and the separator layer, or in the separator layer. The voltage is less than a threshold value of a characteristic breakdown voltage of the separator layer.

According to another aspect of the present disclosure, method of testing a battery is disclosed. The method comprises: applying a voltage to an assembly comprising a first battery electrode, a second battery electrode and a separator layer disposed between the first and second battery electrodes; logging measures of a current caused by partial discharges in the separator layer caused by the contaminants or voids in the separator layer, or at an interface between the first battery electrode and the separator layer, or at an interface between the second battery electrode and the separator layer, or in the separator layer, wherein the voltage is less than a threshold value of a characteristic breakdown voltage of the separator layer; and outputting the measures of the current of the partial discharges caused by the partial discharges to determine a pass or a fail for the assembly.

According to another aspect of the present disclosure, a system for testing batteries is disclosed. The system comprises: a controller comprising a processor; a tangible, non-transitory computer-readable medium that stores instructions, which when executed by the processor causes the processor to: apply a voltage from a voltage source to an assembly comprising a first battery electrode, a second battery electrode and a separator layer disposed between the first and second battery electrodes; and control a current logger connected to the second battery electrode to measure a current caused by partial discharges in the separator layer caused by the contaminants or voids in the separator layer, or at an interface between the first battery electrode and the separator layer, or at an interface between the second battery electrode and the separator layer, or in the separator layer. The voltage is less than a threshold value of a characteristic breakdown voltage of the separator layer. The instructions further cause the processor to determine a pass or a fail for the assembly.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
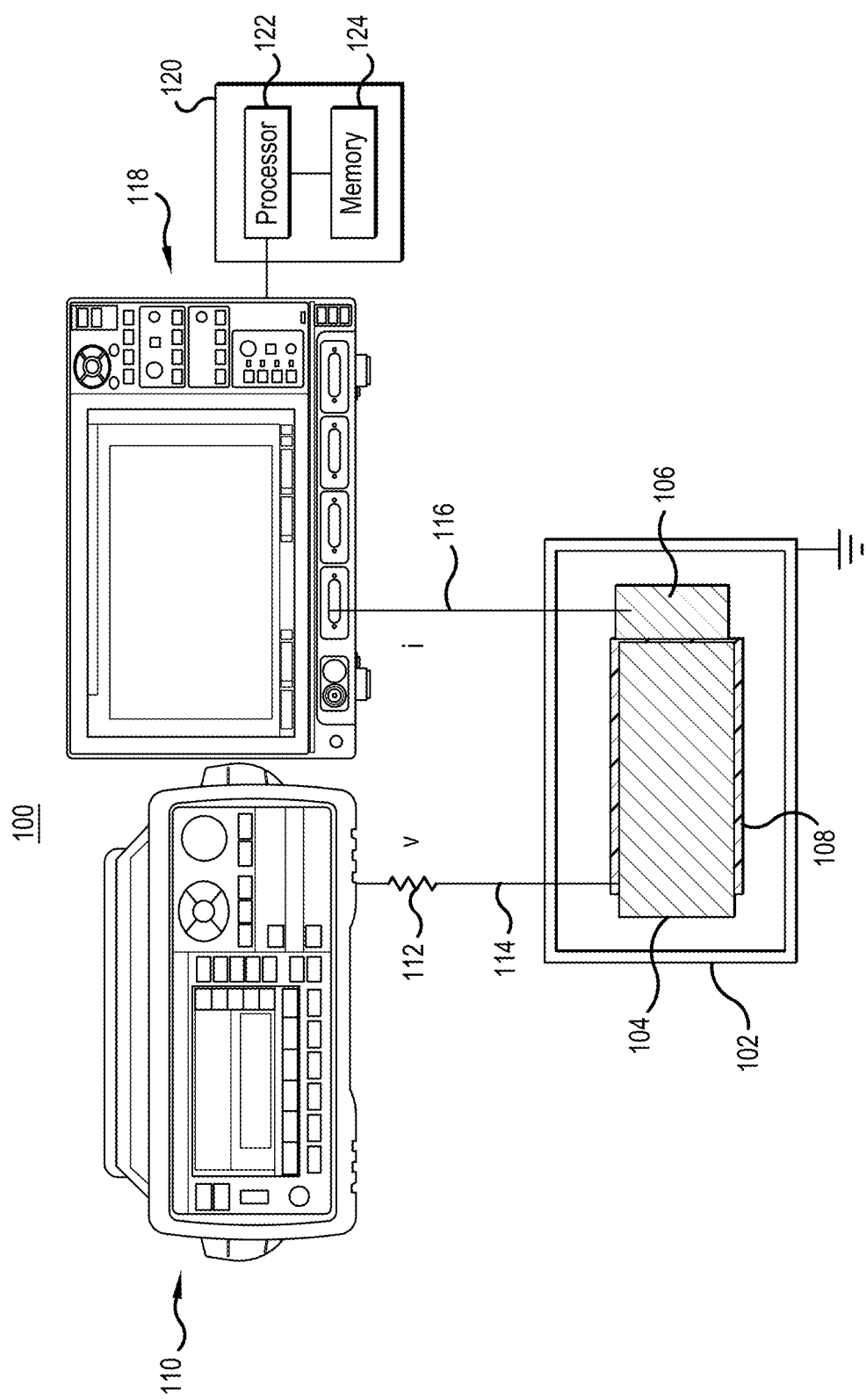
FIG. 1 is a simplified block diagram of a system for testing an assembly, according to a representative embodiment.

In the following detailed description, for the purposes of explanation and not limitation, representative embodiments disclosing specific details are set forth in order to provide a thorough understanding of an embodiment according to the present teachings. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. The defined terms are in addition to the technical and scientific meanings of the defined terms as commonly understood and accepted in the technical field of the present teachings.

It will be understood that, although the terms first, second, third, etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

The terminology used herein is for purposes of describing particular embodiments only and is not intended to be limiting. As used in the specification and appended claims, the singular forms of terms "a," "an" and "the" are intended to include both singular and plural forms, unless the context clearly dictates otherwise. Additionally, the terms "comprises," "comprising," and/or similar terms specify the presence of stated features, elements, and/or components, but do not preclude the presence or addition of one or more other features, elements, components, and/or groups thereof. As used herein, the term "and/or" includes any and all combinations of one or more of the associated listed items.

Unless otherwise noted, when an element or component is said to be "connected to," "coupled to," or "adjacent to" another element or component, it will be understood that the element or component can be directly connected or coupled to the other element or component, or intervening elements or components may be present. That is, these and similar terms encompass cases where one or more intermediate elements or components may be employed to connect two elements or components. However, when an element or component is said to be "directly connected" to another element or component, this encompasses only cases where the two elements or components are connected to each other without any intermediate or intervening elements or components.

As used in the specification and appended claims, and in addition to their ordinary meanings, the term "approximately" mean to with acceptable limits or degree. For example, "a count value of an assembly under test is greater than approximately 10% of a count value of an intact separator" means one of ordinary skill in the art would consider the count values differ by 10% within reasonable measure.

As used in the specification and appended claims, in addition to their ordinary meanings, the term 'substantially' means within acceptable limits or degree. For example, the "partial discharge currents are substantially the same" means one of ordinary skill in the art would consider the partial discharge currents to be the same.

The present disclosure, through one or more of its various aspects, embodiments and/or specific features or sub-components, is thus intended to bring out one or more of the advantages as specifically noted below. For purposes of explanation and not limitation, example embodiments disclosing specific details are set forth in order to provide a thorough understanding of an embodiment according to the present teachings. However, other embodiments consistent with the present disclosure that depart from specific details disclosed herein remain within the scope of the appended claims. Moreover, descriptions of well-known apparatuses and methods may be omitted so as to not obscure the description of the example embodiments. Such methods and apparatuses are within the scope of the present disclosure.

By the present teachings, and as described herein with respect to various representative embodiments, comparatively small "partial" discharges, which are shorter in duration and smaller in magnitude than those caused by deleterious electrical breakdown discharges, are used to test the dielectric separator between two conducting electrodes of a battery when applying a voltage that is less than a threshold value of a characteristic breakdown voltage of the separator layer well below the electrical breakdown voltage. Just by way of illustration, the threshold value may be approximately 10% to 30% of the characteristic breakdown voltage of the separator layer of the assembly being tested. Partial discharges occur stochastically, i.e. randomly, with the random distribution governed by a physical law. The higher the electrical field, the higher the probability of a partial electrical discharge. Voids in the dielectric material and sharp contours (i.e. abnormal grain structures, indentations, contaminants etc.) can lead to a local increase of the electric field giving rise to a higher number of partial discharges. The presence of such separator defects are detectable in the form of an anomalous distribution of partial discharges. Notably, as used herein, the term "defects" comprises both contaminants and voids. These separator defects are then assessed to determine if an assembly comprising the first and second electrodes and the separator layer therebetween is free enough of defects to be used in production of a battery, or if these defects are too abundant to pass the assembly for use in a battery.

Various improvements to the field of measurement and testing are realized by the implementation of practical applications of the present teachings and according to representative embodiments described below. As will become clearer as the present description continues, the apparatus, method and system of the various representative embodiments test the separator layer of the assembly by partial discharges and, by limiting the applied voltage to the noted threshold, avoids full discharge across the separator layer. A full discharge occurs when a plasma is basically created in the whole material. This plasma basically burns through the entire thickness of the separator layer. As noted above, the apparatus, method and system of the various representative embodiments described herein by contrast have comparatively small discharges caused by an increase in the local electric field at the region of the contaminant or void that is high enough to cause a localized plasma that discharges across the localized region of the contaminant or void. As such, and by way of example, compared to the existing methods of testing assembly, the apparatus, system and method of the various embodiments are non-destructive at least because voltages above a threshold value of a characteristic breakdown voltage are avoided. Compared to the existing these known comparatively high-voltage testing methods, the present teachings afford the advantage of being substantially non-destructive thereby substantially avoiding false-positives and the attendant waste during production, as well as unreliable data. Moreover, the present teachings foster detection of thousands of partial discharges instead of one full discharge, thereby providing more data available to be analyzed statistically. Accordingly, the apparatus, system and method of the representative embodiments reliable in identifying contaminated separators in battery cells. The statistical analysis furthermore allows for the identification of different kinds and degrees of defects. Moreover, compared to certain known methods of testing separator layers, the present teachings accord a less expensive, faster and less labor intensive apparatuses, systems and methods of testing of the assembly resulting in comparatively cheaper and faster battery testing. In all, the apparatuses, systems and methods of the present teachings provide a significant improvement in not only quality, but also cost in the field of battery manufacture.

FIG. 1 is a simplified block diagram of a system 100 for testing an assembly comprising a first electrode 106, a second electrode 104 and a separator layer 108 disposed therebetween. The first electrode 106 and the second electrode 104 comprise a known electrically conductive material used in batteries. As alluded to above, the assemblies of various representative embodiments are components of and LIB (not shown). As such, the first electrode 106 (the negative electrode) comprises graphite disposed on an aluminum foil and the second electrode 104 (the positive electrode) comprises i.e. NCA (Nickel Cobalt Aluminium Oxide) disposed on a copper foil. The separator layer 108 illustrative comprises a suitably polymer such as polyolefin. It is emphasized that the noted materials are merely illustrative, and other materials are contemplated for the assembly. Moreover, LIB's are also merely illustrative, and the present teaches contemplate the application of the apparatus, method and system of testing batteries according to the various representative embodiments. Notably, the present teachings are contemplated for use in testing other types of batteries useful in a number of applications in mobile electronic devices and electric power sources for vehicles. Just by way of illustration, the various representative embodiments contemplate application in sodium ion batteries (NIB's).

The assembly is disposed in a measurement fixture 102. The measurement fixture 102 comprises an electrically conductive material that is connected to ground (e.g., the ground of the voltage source 110) as shown to shield the assembly from ambient electrical signals, according to a representative embodiment. A current logger 118 is a component of the system 100, and as described more fully below, the current logger 118 selected for use in the system 100 has a comparatively low noise floor. As such, the measurement fixture 102 beneficially shields the assembly from ambient signals from being detected by the current logger.

The system 100 comprises a low noise, voltage source 110 for applying a voltages across the separator layer 108 to test the assembly according to representative embodiments described more fully below. The voltage source 110 is connected to the assembly using a transmission line 114 (e.g., a coaxial transmission line). A series resistor 112 is connected in series to limit the maximum current.

As described more fully below, the voltage source 110 is selected to apply a constant and sufficiently high electrical voltage between the first and second electrodes 106, 104 such that partial discharges used in the battery testing according to the present teaching occur. Just by way of example, the voltage source may be a commercially available voltage source such as a Keysight® B2985A.

The current logger 118 is adapted to measure current from the partial discharges across the separator layer 108 as described more fully below. As will become clearer as the present description continues, the current logger 118 is used to acquire the current-vs-time trace data and is selected to have a sufficient bandwidth and comparatively low noise floor for use according to the apparatus, method and system for battery testing of the representative embodiments. Illustratively, the current logger 118 has a bandwidth greater than approximately 100 kilosamples per second (kSa/s) and a comparatively low noise floor (<1nA). Just by way of example, the current logger may be a commercially available current logger such as a Keysight® CX3324A.

The system comprises a computer 120 connected to the current logger 118 as shown. The computer 120 comprises a processor 122 and a memory 124. The memory 123 is a tangible, non-transitory computer readable medium (CRM) that stores computer code (also referred to as software instructions herein). When executed by the processor, the instructions cause the processor to record data from the current logger 118, and analyze the data according to various methods of the present teachings. As will become clearer as the present description, method 900 is adapted to be carried out via the computer 120 to determine useful statistical information such as of dwell time, partial discharge counts, and current from the partial discharges, to determine whether an assembly passes or fails the test.

As noted, the computer 120 illustratively comprises one or more processing devices (e.g., processor 122), and is configured to execute software instructions ("instructions") to perform functions as described in the various embodiments herein. The computer 120 may comprise field programmable gate arrays (FPGAs), application specific integrated circuits (ASICs), a general purpose computer, a central processing unit, a computer processor, a microprocessor, a microcontroller, a state machine, programmable logic device, or combinations thereof, using any combination of hardware, software, firmware, hard-wired logic circuits, or combinations thereof. Additionally, any processing unit or processor herein may include multiple processors, parallel processors, or both. Multiple processors may be included in, or coupled to, a single device or multiple devices.

The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems, such as in a cloud-based or other multi-site application. The term computing device should also be interpreted to include a collection or network of computing devices each including a processor or processors. Programs have software instructions performed by one or multiple processors that may be within the same computing device or which may be distributed across multiple computing devices.

The memory 124 may include a main memory and/or a static memory, where such memories may communicate with each other and the processor 122 via one or more buses. The memory 124 stores instructions used to implement some or all aspects of testing methods as described herein. The memory 124 may be implemented by any number, type and combination of random access memory (RAM) and read-only memory (ROM), for example, and may store various types of information, such as software algorithms, which serves as instructions, which when executed by a processor cause the processor to perform various steps and methods according to the present teachings. For example, in accordance with various representative embodiments, the instructions in the memory 124 cause the computer 120 to determine useful statistical information such as of dwell time, partial discharge counts, and current from the partial discharges, to determine whether an assembly passes or fails the test.

The various types of ROM and RAM of the memory 124 may include any number, type and combination of computer readable storage media, such as a disk drive, flash memory, an electrically programmable read-only memory (EPROM), an electrically erasable and programmable read only memory (EEPROM), registers, a hard disk, a removable disk, tape, compact disk read only memory (CD-ROM), digital versatile disk (DVD), floppy disk, Blu-ray disk, a universal serial bus (USB) drive, or any other form of storage medium known in the art. The memory 124 is a tangible storage medium for storing data and executable software instructions, and is non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The memory 124 may store software instructions and/or computer readable code that enable performance of various functions. The memory 124 may be secure and/or encrypted, or unsecure and/or unencrypted.

"Memory" is an example of tangible, non-transitory computer-readable storage media, and should be interpreted as possibly being multiple memories or databases. The memory 124 may, for instance, be multiple memories or databases local to the computer 120, and/or distributed amongst multiple computer systems or computing devices. Furthermore, the memory 124 comprise a computer readable storage medium that is defined to be any medium that constitutes patentable subject matter under 35 U.S.C. § 101 and excludes any medium that does not constitute patentable subject matter under 35 U.S.C. § 101.

Figure 2:
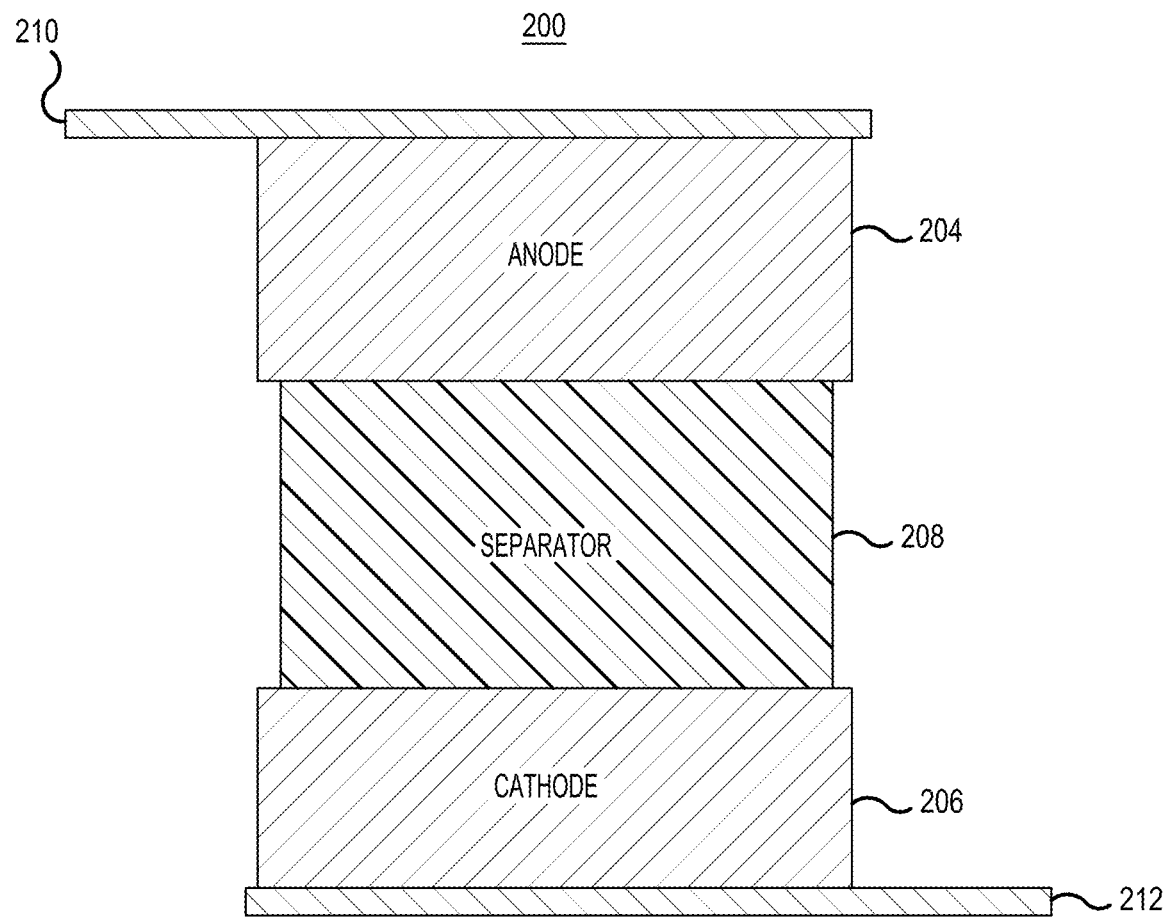
FIG. 2 is a cross-sectional view of an assembly under test, according to a representative embodiment.

FIG. 2 shows an assembly 200 in accordance with a representative embodiment. Various aspects and details of the assembly 200 are common to the assembly discussed above in connection with the representative embodiments of FIG. 1. These aspects and details may not be repeated in order to avoid obscuring the presently described assembly 200.

The assembly 200 comprises an anode 204, a separator layer 208, and a cathode 206. As noted above, the anode 204 illustratively comprises a metal or a metal oxide, the cathode illustratively comprises graphite, and the separator layer illustratively comprises a polymer material. More generally, the anode 204, the separator layer 208 and the cathode 206 are made of materials contemplated for these components of a battery (e.g. an LIB or an NIB). For purposes of clarification, the anode 204 and the cathode 206 each have a thickness in the range of approximately 100 µm, and the separator layer 208 has a thickness of approximately 10 µm to approximately 30 µm.

Finally, the assembly 200 is connected to a voltage source (e.g., voltage source 110) and a current logger (e.g., current logger 118) by a first electrical contact 210 and a second contact 212, respectively.

In an example below used to illustrate various aspects of a separator layer, the separator layer 208 comprises a porous layer of polyester fibers coated with ceramics having a thickness of approximately 21 µm. As described more fully below, the voltage applied across the separator layer 208 during the testing according to various representative embodiments is selected to be less than a threshold value of the breakdown voltage of the separator layer 208. By selecting the voltage applied across the separator layer 208 that is less than a threshold value of the breakdown voltage of the separator layer 208, partial discharges caused by contaminants and voids can occur, but the breakdown of the separator layer 208 is substantially avoided. Just by way of illustration, for the 21 µm thick layer of polyester fibers coated with ceramics as noted above, used for separator layer 208, the breakdown voltage is approximately 450V. The threshold voltage applied across the separator layer 208 by the voltage source 110 is illustratively in the range of approximately 10% to approximately 30% less than the breakdown voltage. As such, the threshold voltage in the present illustrative example is in the range of approximately 45V to approximately 135V less than the breakdown voltage of this particular separator layer. Accordingly, the threshold value of the breakdown voltage applied across the separator layer to cause partial breakdown caused by contaminants and voids is between 405V and 315V. For the separator layer 208 of the noted material and thickness, application of the threshold voltage in the ranger of approximately 315V to approximately 405V according to the apparatus, method and system of battery testing of the various representative embodiments will result in any partial discharges dues to contaminants and voids as discussed below, but will not result in a breakdown of the separator layer 208. Beneficially, and as noted above, the apparatus, method and system of battery testing of the various representative embodiments provide substantially non-destructive thereby substantially avoiding false-positives and the attendant waste during production, as well as unreliable data. Moreover, the present teachings foster detection of thousands of partial discharges instead of one full discharge, thereby providing more data available to be analyzed statistically. Accordingly, the apparatus, system and method of the representative embodiments reliably identify defective separators in battery cells. Compared to certain known methods of testing separator layers, the apparatus, method and system of the various representative embodiments accord a less expensive, faster and less labor intensive testing the assembly 200.

Figure 3:
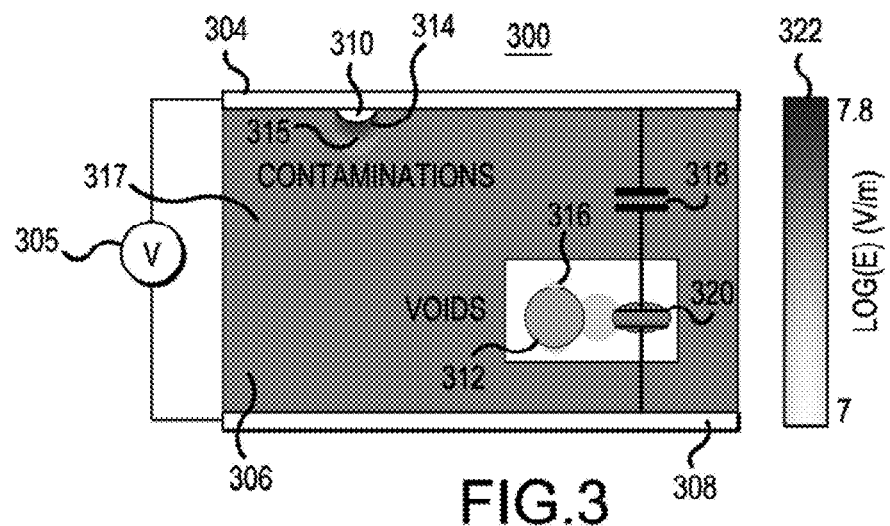
FIG. 3 is a conceptual view of an electric field in a separator placed between two electrodes and effect of contaminations and voids on the local field strength.

FIG. 3 is a conceptual view of an electric field in an assembly 300 under test in accordance with a representative embodiment. Various aspects and details of the assembly 300 are common to the assembly discussed above in connection with the representative embodiments of FIGS. 1 and 2. These aspects and details may not be repeated in order to avoid obscuring the presently described assembly 300.

The assembly comprises a separator layer 306 disposed between a first electrode 304 and a second electrode 308 and illustrates sources of partial discharge in the assembly. Notably, a contaminant 310 can exist in the interface between the first electrode 304 and the separator layer 306. Although not shown, contaminants may also exist in the interface between the separator layer 306 and the second electrode 308. These contaminants 310 may be, for example, conductive materials inadvertently placed between the separator layer 306 and the first and second electrodes 304, 308 during fabrication of the assembly 300. The contaminants 310 cause shorts upon the application of a voltage 305 (such as from voltage source 110) across the separator layer 306. These shorts are partial discharges across the assembly result in changes in the local electric field. For example, in region 314 is highest immediately adjacent to the contaminant 310, and lessens as the distance from the contaminant 310 increases (e.g., at region 315). Just by way of illustration, and based on a scale 322 of the electric field strength (V/m), in the region 314, the electric field strength is approximately $10^{\wedge}7.8$ V/m, whereas in region 315 the field strength is approximately $10^{\wedge}7.6$ V/m. Notably, in region 317 the electric field strength is approximately $10^{\wedge}7.3$ V/m, which is below the breakdown voltage of the separator layer 306. As such, partial discharges caused by contaminants can be evaluated to determine whether assembly 300 passes or fails the battery test, but avoids breakdown of the separator layer 306 and the attendant loss and other resultant shortcomings.

In addition to contaminants at the interfaces discussed above, undesired voids 312 can exist in the separator layer 306. The voids 312 may result during manufacture of the separator layer 306. These voids cause a parasitic capacitance 320, which are in addition to a capacitance 318 that exists because of the conductor/dielectric/conductor structure of the first electrode 304/the separator layer 306/the second electrode 308. As shown for example, at 316, the local electric field strength becomes stronger than in the region of the void 312. These void 312 also results in a partial discharge. These partial discharges are also a measure of the quality of the separator layer 306, with their dwell times, count values, and currents used to assess whether the separator layer passes or fails the battery test according to a representative embodiment.

Testing of the separator layer 306 according to a representative embodiment may be carried out as follows. The voltage source 110 and series resistor 112 are electrically connected to the first and second electrodes 304, 308, with the separator layer 306 placed therebetween. The separator is "dry", i.e. not soaked with electrolytes. Notably, the testing and the whole process is performed under ambient conditions, i.e. roughly room temperature and normal ambient atmosphere.

Depending on the air humidity there may already be static charges in the assembly 300 at the beginning of the procedure. Since the charges, together with the high voltage, could lead to full discharge a preconditioning procedure can be included that removes static charges from the sample. This consists of applying a voltage ramp from a voltage lower than the target voltage (e.g., approximately 200V) to the target voltage (e.g., approximately 350V or approximately 400V) to the separator layer 306.

At a time t=0 the high voltage is applied from the voltage source to a level below the noted threshold value less than the breakdown voltage of the separator layer (e.g., 350V for the illustrative separator having 21 µm thickness discussed above). Since the breakdown voltage depends on the type of material and the thickness of the separator layer being tested, the exact value of the voltage needs to be adjusted for each specific separator layer. As noted above, the first and second electrodes 304, 308 and the separator layer 306 effectively function as a capacitor, the measured resulting current is governed by an exponential decay with a time constant $\tau = R_{limit} C_{sep}$, with $R_{limit}$ being the series resistor 112 and $C_{sep}$ being the effective capacitance between the first and second electrodes 304, 308. An exponential fit to the current data is subtracted from the data resulting in the data shown in FIG. 4 discussed below. (The subtraction of the exponential effectively acts as a high-pass filter.) Since t can be measured, and $R_{limit}$ is known, $C_{sep}$ can be calculated, and this value gives us an independent measure of the average electric field within the separator. (The area and dielectric constant of the separator are known). Note that the electric field can vary between individual cells depending on how is the exact distance between both electrodes, which depends on the pressure applied on them in the manufacturing process, and the accuracy of assembly of the cells. Since partial discharges are proportional to the electrical field, it is important to control the field strength by adapting the voltage. This voltage adaption can be implemented as automatized process as part of the preconditioning procedure described above.

Figure 4:
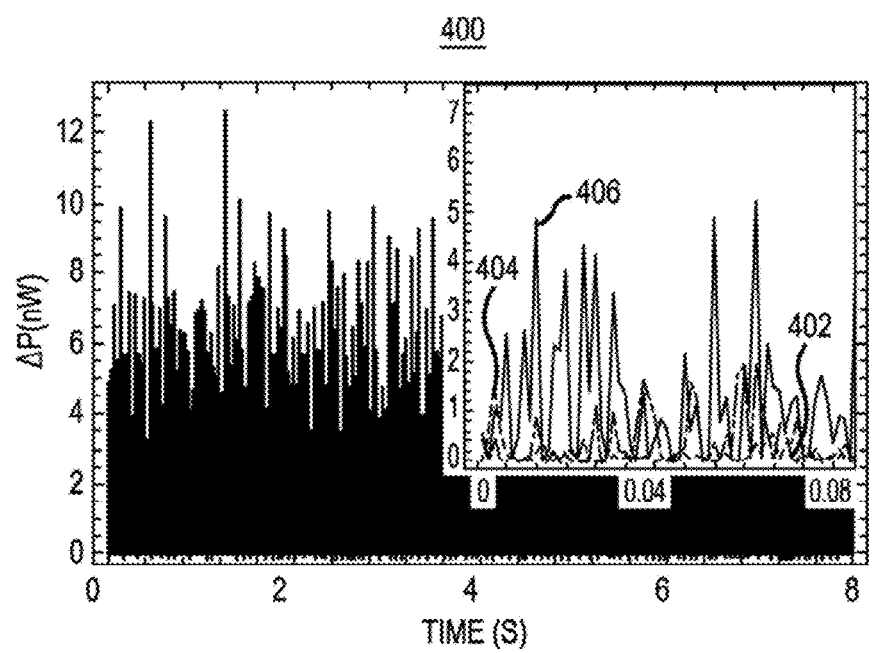
FIG. 4 is a graph showing electrical power of partial discharge across the assembly versus time according to a representative embodiment.

FIG. 4 is a graph 400 showing electrical power of partial discharge across the assembly versus time according to a representative embodiment. Various aspects and details of the graph 400 are common to the assembly discussed above in connection with the representative embodiments of FIGS. 1-3, and may not be repeated to avoid obscuring the description of FIG. 4.

Graph 400 shows the change in power (nW) versus time caused by partial discharges from three different separator layers. In the inset, an intact separator layer shows data 402. An intact separator layer has comparatively few contaminants at the interfaces of the separator layer and the first and second electrodes of the assembly. Accordingly, upon application of a voltage across the separator layer (e.g., using voltage source 110), the current (and thus the power) measured by the current logger and caused by partial discharges in the intact separator layer is comparatively low. Moreover, and as described more fully below, in addition to a comparative low current due to partial discharges, the time between partial discharges is comparatively long. This is due to the lower number of partial discharges that occur in an intact separator layer, and thus the lower current.

Metallic particles from the current collector (e.g., the copper or aluminum foil wrapped around the electrodes) or loose particles from the electrode material itself contaminate the interface of the electrode and the separator layer and cause the incidence of partial discharge as shown as data 404. There are comparatively more contaminants at the interface of the separator layer and the second electrode of this assembly. Accordingly, upon application of a voltage across the separator layer (e.g., using voltage source 110), the current (and thus the power) measured by the current logger and caused by partial discharges in separator layer having electrode particles high compared to that of the intact separator layer. Moreover, and as described more fully below, in addition to a comparatively high current due to partial discharges, the time between partial discharges is comparatively short. This is due to the increased number of partial discharges that occur in a separator layer having contaminants at the noted interfaces compared to an intact separator layer, and thus the comparatively higher current. As described more fully below, another measure of the number of counts of partial discharges can be used in addition to the measured current caused by the partial discharges and the dwell time between partial discharges can be used to determine whether a separator layer passes or fails the battery test of the representative embodiments.

Aluminum platelets (e.g. from the current collector material) placed at the interface of the electrode and the separator layer cause contaminants and the incidence of partial discharge is shown as data 406. There are comparatively even more contaminants at the interfaces of the separator layer and the electrode of this assembly. Accordingly, upon application of a voltage across the separator layer (e.g., using voltage source 110), the current (and thus the power) measured by the current logger and caused by partial discharges in separator layer having electrode particles exceedingly high compared to that of the intact separator layer. Moreover, and as described more fully below, in addition to a comparatively very high current due to partial discharges, the time between partial discharges is significantly shorter compared to an intact separator layer. This is due to the marked increased number of partial discharges that occur in a separator layer having contaminants at the noted interfaces compared to an intact separator layer, and thus the comparatively higher current. As described more fully below, another measure of the number of counts of partial discharges can be used in addition to the measured current caused by the partial discharges and the dwell time between partial discharges can be used to determine whether a separator layer passes or fails the battery test of the representative embodiments.

Figure 5:
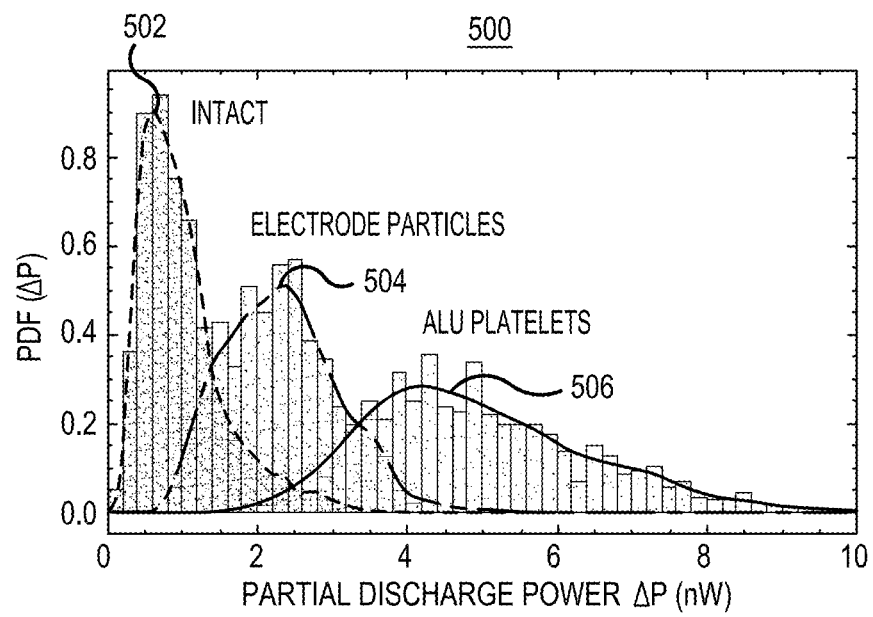
FIG. 5 shows histograms of electrical power of partial discharge across the assembly shown in FIG. 4.

FIG. 5 is a graph 500 showing the probability density function (PDF) of counts of partial discharges across the assembly versus power according to a representative embodiment. Various aspects and details of the graph 500 are common to the assembly discussed above in connection with the representative embodiments of FIGS. 1-4, and may not be repeated to avoid obscuring the description of FIG. 5.

Graph 502 shows the counts of partial discharges PDF versus power for an intact separator layer. As shown, the power of these counts is comparatively low, and the counts are comparatively few in number. This is to be expected from an intact layer, which has comparatively few contaminants that cause comparatively low power partial discharges across the separator layer.

Graph 504 shows the counts of partial discharges PDF versus power for a separator layer having graphite particle contaminants at the interface of the separator layer and the graphite electrode. As shown, the power of these counts is increased compared to the intact separator layer, and the counts are comparatively increased in number. This is to be expected from the interface of the electrode and the separator layer, which has comparatively more contaminants that cause comparatively increased power partial discharges across the separator layer.

Graph 506 shows the counts of partial discharges PDF versus power for a separator layer having aluminum platelets as contaminants at the interface of the separator layer and the electrode. As shown, the power of these counts is significantly increased compared to the intact separator layer, and the counts are comparatively greatest in number in this assembly. This is to be expected from the interface of the electrode and the separator layer, which has comparatively more contaminants that cause comparatively increased power partial discharges across the separator layer.

Figure 6:
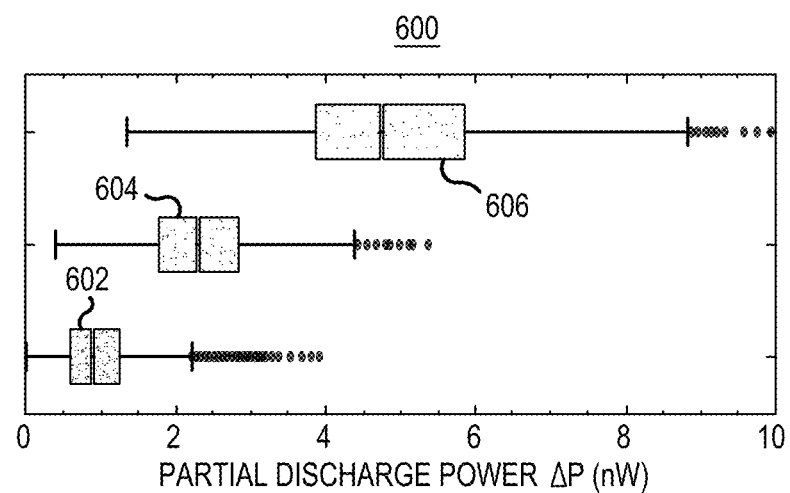
FIG. 6 shows box charts of the electrical power of partial discharge across the assembly shown in FIG. 4.

FIG. 6 is a graph 600 showing electrical power of partial discharge across the assembly versus time according to a representative embodiment. Various aspects and details of the graph 600 are common to the assembly discussed above in connection with the representative embodiments of FIGS. 1-5, and may not be repeated to avoid obscuring the description of FIG. 6.

The box plots 602, 604, 606 provide the statistical data of the histograms in graph 500 showing the distribution of power of the discharge spikes for the intact separator layer, and the discharge spikes caused by the electrode contaminants from electrode particles and aluminum, respectively. While for the intact separator discharges only take place with relatively low power, which can hardly be distinguished from the overall measurement noise, contaminated electrodes show partial discharges with higher power and a wider distribution of power levels.

The average power of the discharges and standard deviation from box plots 602, 604 and 604 are determined in accordance with an apparatus, method and system of battery testing of a representative embodiment. Based on these data, the method of a representative embodiment provides clear criteria to reliably distinguish between intact and faulty/contaminated separator layers. To this end, the number and power of the partial discharges in box plot 602 are comparatively low. Moreover, because of the comparatively few partial discharges in this separator layer, the decision could be made that the assembly comprising this separator layer is qualified to be used in a battery. As such, according to the present method, the instructions store in memory 124 would cause the processor 122 to determine that this assembly is not qualified for use in a battery.

By contrast, box plots 604 and 606 reveal the number and power of the partial discharges the respective separator layers of this assembly is comparatively high. Moreover, because of the comparatively large number of partial discharges in this separator layer, the decision could be made that the assembly comprising this separator layer is not qualified to be used in a battery. As such, according to the present method, the instructions store in memory 124 would cause the processor 122 to determine that this assembly is not qualified for use in a battery.

Figures 7A, 7B, 7C:
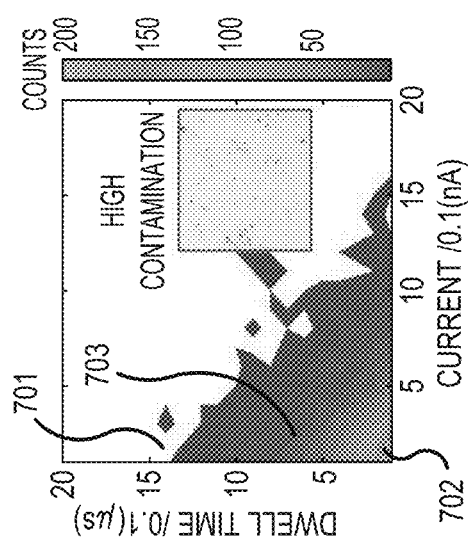
FIGS. 7A-7C are plots showing dwell time between partial discharges and partial discharge counts versus partial discharge current of assemblies comprising different amounts of contaminants tested according to a representative embodiment.

FIGS. 7A-7C are plots showing dwell time between partial discharges and partial discharge counts versus partial discharge current of assemblies comprising different amounts of contaminants tested according to a representative embodiment. Various aspects and details of the embodiments described in connection with FIGS. 1-6 may be common to those described in connection with FIGS. 7A-7C. These details may not be repeated in order to obscuring the description of the presently described representative embodiments.

FIG. 7A depicts the dwell time and partial discharge counts (counts) versus current of the partial discharges in a separator layer. As can be seen, the dwell time distribution is long compared to other separator layers discussed in connection with FIGS. 7B-7F. Moreover, the count number at 702 is comparatively low, even at initial voltage application, and much lower at 703. These data of dwell time, counts and current are gathered by the current logger 118, and upon execution of instructions stored in the memory 124, the processor 122 outputs these data in a form for comparatively straight forward assessment of whether the separator layer passes or fails. One example of this output data is shown and described in connection with FIG. 8, and via the method of FIG. 9. Notably, the separator layer data of FIG. 7A reveal a comparatively long dwell time distribution, a comparatively low count distribution, and a comparatively low current. Based on these data, the separator sample would be classified by the processor 122 as a comparatively clean separator layer with few contaminants and voids. Based on these quality parameters, the processor 122 would output a pass for the separator layer, which can be deployed in a battery.

FIG. 7B depicts the dwell time and partial discharge counts (counts) versus current of the partial discharges in a separator layer. As can be seen, the dwell time distribution is shorter than the separator layer discussed in connection with FIG. 7A. Moreover, the count number at 702 is comparatively higher than that of the separator of FIG. 7A, but lower at 703. These data of dwell time, counts and current are gathered by the current logger 118, and upon execution of instructions stored in the memory 124, the processor 122 outputs these data in a form for comparatively straight forward assessment of whether the separator layer passes or fails. Notably, the separator layer data of FIG. 7B reveal a comparatively shorter dwell time distribution, a comparatively higher count distribution, and a comparatively higher current. Based on these data, the separator sample would be classified by the processor 122 as a separator layer with a moderate level contaminants and voids. Based on these quality parameters, the processor would output a pass or a fail of this separator layer.

FIG. 7C depicts the dwell time and partial discharge counts (counts) versus current of the partial discharges in a separator layer. As can be seen, the dwell time distribution is significantly shorter than the separator layer discussed in connection with FIG. 7A. Moreover, the count number at 702 is significantly higher than that of the separator of FIG. 7A, and remains somewhat high across the test as shown at 703. These data of dwell time, counts and current are gathered by the current logger 118, and upon execution of instructions stored in the memory 124, the processor 122 outputs these data in a form for comparatively straight forward assessment of whether the separator layer passes or fails. Notably, the separator layer data of FIG. 7C reveal a comparatively much shorter dwell time distribution, a comparatively much higher count distribution, and a comparatively much higher current. Based on these data, the separator sample would be classified by the processor 122 as a separator layer with a high level contaminants and voids. Based on the quality parameters, the processor would output a fail of this separator layer for deployment in a battery.

Figures 7D, 7E, 7F:
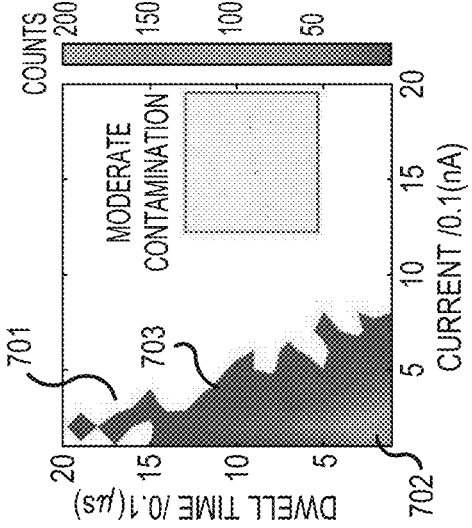
FIGS. 7D-7F are plots showing dwell time between partial discharges and partial discharge counts versus partial discharge current of assemblies comprising different types of contaminants tested according to a representative embodiment.

FIGS. 7D-7F are plots showing dwell time between partial discharges and partial discharge counts versus partial discharge current of assemblies comprising different types of contaminants tested according to a representative embodiment. Various aspects and details of the embodiments described in connection with FIGS. 1-7C may be common to those described in connection with FIGS. 7D-7F. These details may not be repeated in order to obscuring the description of the presently described representative embodiments.

FIG. 7D depicts the dwell time and partial discharge counts (counts) versus current of the partial discharges in a separator layer. As can be seen, the dwell time distribution is long compared to other separator layers discussed in connection with FIGS. 7E-7F, however, short compared to the dwell time of the separator layer of FIG. 7A, for example. Moreover, the count number at 702 is comparatively low relative to other separator layers discussed in connection with FIGS. 7E-7F, however, large compared to the count values of the separator layer of FIG. 7A. These data of dwell time, counts and current values are gathered by the current logger 118, and upon execution of instructions stored in the memory 124, the processor 122 outputs these data in a form for comparatively straight forward assessment of whether the separator layer passes or fails. One example of this output data is shown and described in connection with FIG. 8, and via the method of FIG. 9. Notably, the separator layer data of FIG. 7D reveal a shorter dwell time distribution, a higher count distribution, and greater current values from partial discharges. Based on these data, the separator sample would be classified by the processor 122 as having contaminants of a first particle type, which is illustratively a graphite particle as noted above. Accordingly, based on the instructions stored in memory 124, based on these quality parameters, the processor 122 would output this type of contaminants in the separator layer, which can be used to determine a pass or fail of the separator layer.

FIG. 7E depicts the dwell time and partial discharge counts (counts) versus current of the partial discharges in a separator layer. As can be seen, the dwell time distribution is long compared to other separator layers discussed in connection with FIGS. 7D and 7F, however, short compared to the dwell time of the separator layer of FIG. 7A, for example. Moreover, the count number at 702 is comparatively high relative to other separator layers discussed in connection with FIGS. 7D and 7A, for example. However, the count number at 702 is large compared to the count values of the separator layer of FIG. 7DA. These data of dwell time, counts and current values are gathered by the current logger 118, and upon execution of instructions stored in the memory 124, the processor 122 outputs these data in a form for comparatively straight forward assessment of whether the separator layer passes or fails. Notably, the separator layer data of FIG. 7E reveal a shorter dwell time distribution, a higher count distribution, and greater current values from partial discharges. Based on these data, the separator sample would be classified by the processor 122 as having contaminants of a second particle type, which is illustratively an NCA particle as noted above. Accordingly, based on the instructions stored in memory 124, based on these quality parameters, the processor 122 would output this type of contaminants in the separator layer, which can be used to determine a pass or fail of the separator layer.

FIG. 7F depicts the dwell time and partial discharge counts (counts) versus current of the partial discharges in a separator layer. As can be seen, the dwell time distribution is long compared to other separator layers discussed in connection with FIGS. 7D, however, short compared to the dwell time of the separator layer of FIG. 7A, for example. Moreover, the count number at 702 is comparatively high relative to other separator layers discussed in connection with FIGS. 7E and 7A, for example. However, the count number at 702 is large compared to the count values of the separator layer of FIG. 7DA. These data of dwell time, counts and current values are gathered by the current logger 118, and upon execution of instructions stored in the memory 124, the processor 122 outputs these data in a form for comparatively straight forward assessment of whether the separator layer passes or fails. Notably, the separator layer data of FIG. 7E reveal a shorter dwell time distribution, a higher count distribution, and greater current values from partial discharges. Based on these data, the separator sample would be classified by the processor 122 as having metallic contaminants, which is illustratively an aluminum particle as noted above. Accordingly, based on the instructions stored in memory 124, based on these quality parameters, the processor 122 would output this type of contaminants in the separator layer, which can be used to determine a pass or fail of the separator layer.

Figure 8:
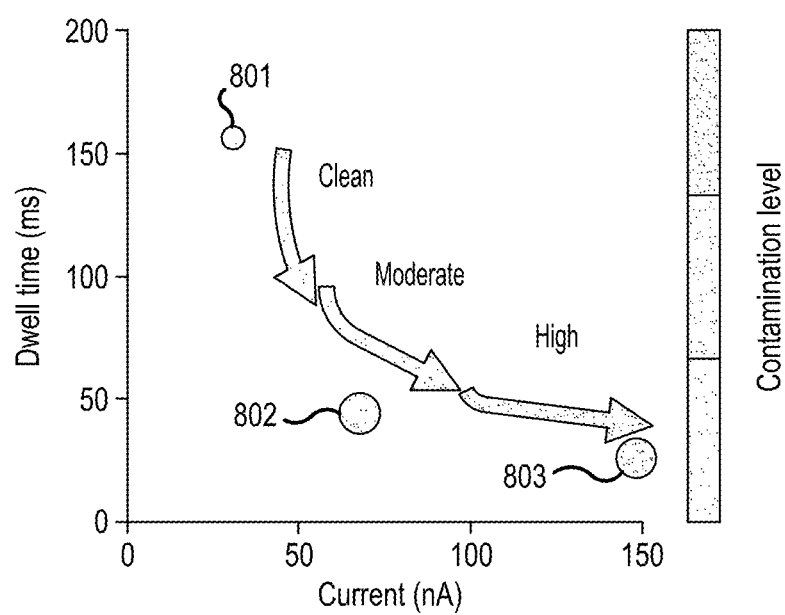
FIG. 8 is a plot showing dwell time between partial discharges and partial discharge counts versus partial discharge current of assemblies comprising low, moderate and high levels of contaminants tested according to a representative embodiment.

FIG. 8 is a plot showing dwell time between partial discharges and partial discharge counts versus partial discharge current of assemblies comprising low, moderate and high levels of contaminants tested according to a representative embodiment. Various aspects and details of the embodiments described in connection with FIGS. 1-7F may be common to those described in connection with FIG. 8. These details may not be repeated in order to obscuring the description of the presently described representative embodiments.

As shown, there are three regions of data for the three sample separator layers displayed. These data are plotted by the processor 122 upon execution of instructions stored in memory and by the method described below in connection with FIG. 9. Notably, the regions (circles on the plot of FIG. 8) have an area that is proportional to the number of partial discharge counts of the representative assemblies.

Region 801 shows data for samples having a comparatively long dwell time, comparatively low counts of particle discharge, and comparatively low current. Based on these criteria, executing instructions stored in memory 124, the processor 122 would consider the separator layers with data in region 801 as clean and would output a pass.

Region 802 shows data for samples having a comparatively shorter dwell time, comparatively higher counts of particle discharge, and comparatively higher current. Based on these criteria, executing instructions stored in memory 124, the processor 122 would consider the separator layers with data in region 801 as moderately contaminated, and would output a pass or fail separator layers with these parameters depending on quality factors of the battery manufacturer.

Region 803 shows data for samples having a comparatively very long dwell time, comparatively very high counts of particle discharge, and comparatively very high current. Based on these criteria, executing instructions stored in memory 124, the processor 122 would consider the separator layers with data in region 801 as highly contaminated and would output a fail.

Figure 9:
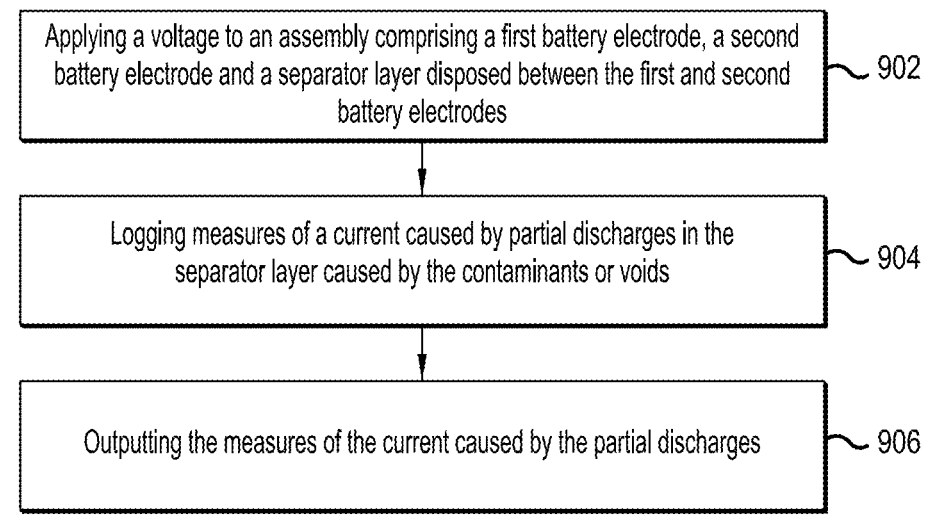
FIG. 9 is a flow chart showing a method of testing batteries according to a representative embodiment.

FIG. 9 is a flow chart showing a method 900 of testing batteries according to a representative embodiment. Various aspects and details of the embodiments described in connection with FIGS. 1-8 may be common to those described in connection with FIG. 9. These details may not be repeated in order to obscuring the description of the presently described representative embodiments.

At the outset, and as alluded to above, the method 900 is adapted to be stored as computer-executable code (instructions) stored in memory 124, these instructions are executed by the processor 122 of the computer 120 to provide the output for the user. The subject matter of the method 900 do not recite a mental process because the steps of the method 900 cannot practically be performed in the human mind, at least because the human mind is not equipped to perform method. To this end, the data gathered by the current logger in the execution of the method 900 is much too great in number for the human mind to process. As such, the method 900 comprising instructions executed by the processor 122 certainly qualifies as patentable subject matter under 35 U.S.C. § 101.

At 902 the method comprises applying a voltage to an assembly comprising a first battery electrode, a second battery electrode and a separator layer disposed between the first and second battery electrodes. As discussed above, the voltage is applied to the assembly based on control instructions executed by the processor 122 provided to the voltage source 110. Notably, based on the control signals from the processor, the voltage applied to the assembly is less than a threshold value of a characteristic breakdown voltage of the separator layer At 904, the method comprises logging measures of a current caused by partial discharges in the separator layer caused by the contaminants or voids in the separator layer, or at an interface between the first battery electrode and the separator layer, or at an interface between the second battery electrode and the separator layer, or in the separator layer. As noted above, the current logger 118 logs the noted measures, which include dwell time, count value and current level of the partial discharges caused by the application of the voltage below the threshold level for the material of the separator layer and it dimensions. As alluded to above, a great number of data of these measures are provided by current logger 118 for further processing by the processor 122 executing instructions stored in memory 124.

At 906, the method continues with outputting the measures of the current of the partial discharges caused by the partial discharges to determine a pass or a fail for the assembly. Again, these measures include dwell time, count value and current level of the partial discharges caused by the application of the voltage below the threshold level for the material of the separator layer and it dimensions. These data are gathered and processed by the processor 122 executing the instructions stored in memory to provide to the user with useful information such as a decision of pass or fail of the separator layer, or levels of contamination, or types of contaminants in the separator layer, or a combination thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The preceding description of the disclosed embodiments is provided to enable a person ordinarily skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. An apparatus for testing a battery, the apparatus comprising:
   a voltage source adapted to apply a voltage to an assembly comprising a first battery electrode, a second battery electrode and a separator layer disposed between the first and second battery electrodes; and
   a current logger connected to the second battery electrode, and adapted to measure a current caused by partial discharges in the separator layer caused by the contaminants or voids in the separator layer, or at an interface between the first battery electrode and the separator layer, or at an interface between the second battery electrode and the separator layer, or in the separator layer, wherein the voltage is less than a threshold value of a characteristic breakdown voltage of the separator layer.

2. The apparatus of claim 1, the current logger has a bandwidth greater than approximately 100 kilosamples/second (kSa/s) and a noise floor less than approximately 1 nA.

3. The apparatus of claim 1, wherein the current logger is adapted to output plots of dwell time and counts versus current to determine a pass or a fail for the assembly.

4. The apparatus of claim 3, wherein when the dwell time is less than a threshold value of a dwell of an intact separator layer of a same type of separator material and same dimensions, a count value is greater than a threshold value of a count value of the intact separator layer, and a mean value of partial discharge current is greater than threshold value of a mean value of a partial discharge current of the intact separator layer, the assembly fails.

5. The apparatus of claim 1, further comprising a measurement fixture adapted to contain the assembly, wherein the measurement fixture comprises an electrically conductive material that is grounded to shield the assembly from ambient electrical signals.

6. The apparatus of claim 1, wherein the contaminants comprise one or more of particles or voids in the separator layer, cathode particles from the first battery electrode, anode particles from the second battery electrode, and aluminum platelets.

7. A method of testing a battery, the method comprising:
   applying a voltage to an assembly comprising a first battery electrode, a second battery electrode and a separator layer disposed between the first and second battery electrodes, wherein the voltage is less than a threshold value of a characteristic breakdown voltage of the separator layer;
   logging measures of a current caused by partial discharges in the separator layer caused by the contaminants or voids in the separator layer, or at an interface between the first battery electrode and the separator layer, or at an interface between the second battery electrode and the separator layer, or in the separator layer; and
   outputting the measures of the current of the partial discharges caused by the partial discharges to determine a pass or a fail for the assembly.

8. The method of claim 7, further comprising providing plots of dwell time and counts versus current to determine the pass or the fail for the assembly.

9. The method of claim 8, wherein when the dwell time is less than a threshold value of a dwell of an intact separator layer of a same type of separator material and dimensions, a count value is greater than a threshold value of a count value of the intact separator layer, and a mean value of partial discharge current is greater than threshold value of a mean value of a partial discharge current of the intact separator layer, and the outputting indicates when the assembly passes or fails.

10. The method of claim 9, wherein the method further comprises shielding the assembly from ambient electrical signals.

11. The method of claim 9, wherein the contaminants comprise one or more of particles or voids in the separator layer, cathode particles from the first battery electrode, anode particles from the second battery electrode, and aluminum platelets.

12. The method of claim 7, wherein the method further comprises, before the applying the voltage to the assembly, performing a preconditioning procedure to substantially remove static charges from the assembly.

13. The method of claim 12, wherein the preconditioning procedure further comprises applying a voltage ramp from a voltage lower than the voltage to the voltage.

14. A system for testing batteries, the system comprising:
   a controller comprising a processor;
   a tangible, non-transitory computer-readable medium that stores instructions, which when executed by the processor causes the processor to:
   apply a voltage from a voltage source to an assembly comprising a first battery electrode, a second battery electrode and a separator layer disposed between the first and second battery electrodes, wherein the voltage is less than a threshold value of a characteristic breakdown voltage of the separator layer;
   control a current logger connected to the second battery electrode to measure a current caused by partial discharges in the separator layer caused by the contaminants or voids in the separator layer, or at an interface between the first battery electrode and the separator layer, or at an interface between the second battery electrode and the separator layer, or in the separator layer; and
   determine a pass or a fail for the assembly.

15. The system of claim 14, wherein the current logger comprises the processor, and the instructions cause the processor to output plots of dwell time and counts versus current to determine whether the assembly passes or fails.

16. The system of claim 14, the current logger has a bandwidth greater than approximately 100 kilosamples/second (kSa/s) and a noise floor less than approximately 1 nA.

17. The system of claim 14, wherein the current logger is adapted to output plots of dwell time and counts versus current to determine a pass or a fail for the assembly.

18. The system of claim 14, wherein when the dwell time is less than a threshold value of a dwell of an intact separator layer of a same type of separator material and same dimensions, a count value is greater than a threshold value of a count value of the intact separator layer, and a mean value of partial discharge current is greater than threshold value of a mean value of a partial discharge current of the intact separator layer, the assembly fails.

19. The system of claim 12, further comprising a measurement fixture adapted to contain the assembly, wherein the measurement fixture comprises an electrically conductive material that is grounded to shield the assembly from ambient electrical signals.

20. The system of claim 15, wherein the contaminants comprise one or more of particles or voids in the separator layer, cathode particles from the first battery electrode, anode particles from the second battery electrode, and aluminum platelets.

* * * * *